(12) United States Patent
Ferguson et al.

(10) Patent No.: US 7,817,789 B2
(45) Date of Patent: Oct. 19, 2010

(54) MASS CALL DEFENSE

(75) Inventors: Thomas Lynn Ferguson, Carrollton, TX (US); Maureen Rose O'Toole, Plano, TX (US)

(73) Assignee: Alcatel Lucent, Paris (FR)

( * ) Notice: Subject to any disclaimer, the term of this patent is extended or adjusted under 35 U.S.C. 154(b) by 11 days.

(21) Appl. No.: 11/458,581

(22) Filed: Jul. 19, 2006

(65) Prior Publication Data

US 2006/0245550 A1 Nov. 2, 2006

Related U.S. Application Data

(63) Continuation-in-part of application No. 10/623,240, filed on Jul. 18, 2003, now Pat. No. 7,130,397.

(51) Int. Cl.
*H04M 15/00* (2006.01)
*H04M 7/00* (2006.01)

(52) U.S. Cl. .............................. 379/112.04; 379/112.1; 379/221.03

(58) Field of Classification Search . 379/112.01–112.1, 379/133, 137–139, 221.03, 221.06, 221.07
See application file for complete search history.

(56) References Cited

U.S. PATENT DOCUMENTS

| 5,042,064 | A | * | 8/1991 | Chung et al. | 379/112.04 |
| 5,828,729 | A | * | 10/1998 | Clermont et al. | 379/32.01 |
| 5,923,742 | A | * | 7/1999 | Kodialam et al. | 379/133 |
| 6,243,449 | B1 | * | 6/2001 | Margulis et al. | 379/112.04 |
| 7,130,397 | B2 | * | 10/2006 | Ferguson et al. | 379/112.04 |

* cited by examiner

*Primary Examiner*—Quoc D Tran
(74) *Attorney, Agent, or Firm*—RG & Associates

(57) ABSTRACT

A system, method, and computer readable medium for mass call defense in a communications network, comprises detecting a mass call event, detecting a resource exhaust event related to the mass call event, where the resource exhaust event is based upon a release message indicating a call connection attempt in excess of a threshold, and releasing, upon detecting the resource exhaust event, subsequent call connection attempts to a called telephone number.

20 Claims, 8 Drawing Sheets

MASS CALL DEFENSE

CROSS REFERENCE TO RELATED APPLICATIONS

The present patent application is a continuation-in-part and claims the benefit of patent application Ser. No. 10/623,240, filed on Jul. 18, 2003, entitled APPARATUS, AND AN ASSOCIATED METHOD, FOR DETECTING A MASS CALL EVENT AND AMELIORATING THE EFFECTS THEREOF the entire contents of which is incorporated by reference herein.

The present patent application is also related to and claims the benefit of provisional patent application No. 60/774,254, filed on Feb. 16, 2006, entitled MASS CALL DEFENSE, the entire contents of which is incorporated by reference herein.

BACKGROUND OF THE INVENTION

The present invention relates generally to a manner by which to facilitate detection of a mass call event in a telephonic network. More particularly, the present invention relates to apparatus, and an associated method, by which automatically to detect the occurrence of the mass call event and, once detected, to permit network operation automatically to be altered, automatically to ameliorate network congestion caused by the mass call event.

Automatic detection of the mass call event and automatic implementation of steps to ameliorate congestion conditions caused by the mass call event permits quicker resolution of the problems associated with the mass call event than when relying on manual intervention to detect and ameliorate the problem. Statistical computations are used to derive parameters that facilitate the detection of the mass call event, permitting reduced amounts of data gathering and processing in the detection process. And, amelioration of the mass call event is carried out in a systematic manner, permitting a selected call rate of calls to be connected while the mass call event continues.

Use of telephonic networks through which to communicate is an endemic part of modern society. Telephonic communications are effectuated pursuant to many types of communication services as well as, perhaps most pervasively, to effectuate voice communication services. Public-access telephonic networks are widely deployed and are regularly used to effectuate the telephonic communications.

The telephonic networks that encompass various geographical areas are interconnected. And, when suitably interconnected, telephonic communications are effectable between telephonic stations connected to, and forming part of, almost any of the telephonic networks that are interconnected there together. Thereby, telephonic communication services are effectuated between locations at which access to a telephonic network is available.

A telephonic network comprises a communications fabric that includes, e.g., a signaling network and switching entities. Telephonic stations forming calling stations are connected to the switch entities, and telephonic stations forming called stations are also coupled to switch entities. The switch entities perform switching functions and are operable, together with operation of the signaling network to form call connections between calling and called stations. When a call connection is formed, telephonic communication between the calling and called stations is permitted.

When telephonic communications are to be effectuated between a calling and a called station, dialed digits associated with the called station are entered at the calling station, such as by user actuation of a telephonic keypad in some telephonic networks. An IAM message, for instance, is formed as part of a call set-up procedure. The IAM message includes values of the dialed digits associated with the called station. Additional signaling is generated as call set-up procedures are carried out, pursuant to conventional operation of the telephonic network. A call request is routed to the called station, and the call is accepted at the called station. The call connection is formed and the telephonic communications commence. When the communication session during which the telephonic communications are effectuated is completed, the communication session is terminated, by sending a release message through the signaling network, and the call connection is terminated.

While the number of concurrent call connections that are capable of formation in the telephonic network is, usually, large, the number of concurrent call connections that can be formed is not infinite. That is to say, the telephonic network is of a finite capacity. And, the telephonic network is constructed to be of a selected size, i.e., to permit a selected level, or capacity of concurrent call connections to be formed. When the capacity of the network is exceeded, call attempts, i.e., attempts to form call connections, fail.

A careful balance between competing goals of increasing the size of the telephonic network and minimizing the costs of the telephonic network is made when selecting the size, i.e., the capacity, of the network. While maximizing the size of the telephonic network minimizes the possibility of the occurrence of call connection attempts that exceed the capacity of the telephonic network, the costs associated with a telephonic network of such capacity would be prohibitively expensive.

Telephonic networks are correspondingly more regularly constructed to be of capacities that permit all of the call connections that are normally requested within a selected standard deviation. That is to say, telephonic networks are typically constructed to be of capacities that permit all of the call connections, within a selected standard deviation, or other normative value, to be completed. When concurrent call connections are attempted in excess of this number, not all of the call connections can be formed. Call connection failure results for at least some of the call connection attempts.

A significant increase in call connection attempts to a called station or a set of called stations is sometimes defined as being a mass call event. During a mass call event, the number of call connection attempts might approach, or exceed, the capacity of the telephonic network. The influx of the call connection attempts causes network congestion that might prevent the completion of revenue-generating calls, thus adversely affecting the profitability of the network.

Mass call events are sometimes caused by generalized mass media initiated calls, such as request for responses to polls, voting, drawings, and fundraisers. These occurrences are generally characterized by a large number of call connection attempts to a specific station within a short time period. And, the call connection attempts are not controlled at the destination, i.e., the called station, or stations, location.

Conventional efforts to reduce the deleterious effects of a mass call event require an operator of the telephonic network both to manually detect the mass call event and then to intervene manually. The time period required both to detect and to intervene manually is sometimes lengthy, necessitating excessive amounts of time in which to ameliorate the effects of the mass call event.

If a manner could be provided by which better to more quickly detect the occurrence of a mass call event, and to ameliorate the effects of the mass call event, improved telephonic network performance would be provided.

It is in light of this background information related to telephonic networks that the significant improvements of the present invention have evolved.

SUMMARY OF THE INVENTION

The present invention, accordingly, advantageously provides an apparatus, and an associated method, by which to facilitate detection of a mass call event in a telephonic network.

Through operation of an embodiment of the present invention, a manner is provided by which automatically to detect the occurrence of the mass call event. And, once the mass call event is detected, network operation automatically is altered, automatically to ameliorate network congestion caused by the mass call event. Because the mass call event is automatically detected, and steps to ameliorate congestion conditions are automatically implemented, quicker resolution of the problems associated with the mass call event is provided in contrast to conventional reliance upon manual intervention to detect and to ameliorate the congestion conditions.

Derived parameters are formed based upon statistical computations to facilitate the detection of the mass call event, thereby to provide for detection of the mass call event responsive to the collection of reduced amounts of data and processing thereof. And, a systematic manner is carried out to ameliorate the mass call event to permit connection of calls at a selected call rate. The mass call event is ameliorated in a controlled manner by permitting call connections to be formed at a controlled rate with called stations associated with the mass call event for so long as the mass call event continues.

In one aspect of the present invention, a mass call event detector is embodied in a signaling network and operates to detect occurrence of a mass call event. The mass call event detector is positioned to receive indications of attempts by calling stations to form call connections with called stations. The indications are IAM messages generated pursuant to conventional call set-up procedures. When detection is made of a mass call event, the detector generates indications of the detection that are provided to network elements that, upon their detection, are used to ameliorate the call congestion caused by the mass call event.

The mass call event detector is embodied, for example, at an application processor of a STP (signaling transfer point). IAM messages are forwarded to the signaling transfer point by switch elements that are connected to calling stations that initiate call requests. A mass call event is a network-operator-defined level of calls placed to a particular calling station, or calling stations, within a selected time period. A match criteria, a value related to the operator-selected threshold value, is used by the mass event detector by which to detect the occurrence of a mass call event.

The mass event detector, in one implementation, utilizes a two-tier detection procedure. During first tier detection procedures, the detector monitors all IAM messages that are generated pursuant to call set-up procedures by monitoring portions, such as the final four digits of telephonic identifiers of the called stations identified in the IAM messages. Monitoring continues for a selected sampling period derived. Any called station identified in IAM messages that meet the match criteria forms a "suspect" mass-call-event called station. Continued monitoring is performed of the number, or numbers, of the suspect called stations. The second period forms a second tier monitoring period. If, during this second tier monitoring period, the telephonic identifier identifying the called station, or stations, is again detected in the IAM messages in excess of the match criteria, the associated called station is determined to be a party to a mass call event.

When the mass call event is detected by the mass call event detector, the number of call connections that are permitted to be completed between calling stations and the offending called station is limited to a selected number of call connections within a selected time period. That is to say, the rate at which call connections are permitted to be made to the offending called station is limited, thereby to control the number of call connections that are made during any period, measured during the duration of the mass call event. When the mass call event is no longer detected, the limitation on the call connections that are permitted to be formed is removed. Normal telephonic network operation thereafter again commences.

Thereby, automatic detection, and steps to ameliorate the effects of, a mass call event are carried out without the need for human intervention. Delays associated with conventional need to manually intervene in some manner in the detection or to take steps to ameliorate the problems associated with the mass call event are obviated.

In these and other aspects, therefore, apparatus, and an associated method, is provided for a telecommunications network. The telecommunications network has network elements, and call connections are formed between calling stations and called stations to permit telephonic communications to be effectuated. Amelioration of network congestion caused by a mass call event is facilitated. A mass call event occurs when a plurality of call connections are requested to be made to a selected set of called stations within a selected time period. A mass call event detector is adapted automatically to receive indications of selected attempts to form call connections between selected calling stations and selected called stations during operation of the telecommunications network. The mass call event detector detects occurrence of the mass call event responsive to the indications of the selected attempts. A notifier is coupled to the mass call event detector to receive indications of detection of occurrence of the mass call event. The notifier notifies the network elements of the mass call event, automatically and free of network interaction. In the exemplary implementation, the STP does not notify other network elements of the event; rather the STP releases the calls to offending number at the rate specified by the user.

A more complete appreciation of the present invention and the scope thereof can be obtained from the accompanying drawings that are briefly summarized below, the following detailed description of the presently preferred embodiments of the invention, and the appended claims.

In one embodiment of the present invention, a method for mass call defense in a communications network, comprises detecting a mass call event, detecting a resource exhaust event related to the mass call event, wherein the resource exhaust event is based upon a release message indicating a call connection attempt in excess of a threshold, and releasing, upon the detecting of the resource exhaust event, subsequent call connection attempts to a called telephone number.

In another embodiment of the present invention, a computer readable medium comprises instructions for, detecting a mass call event indicating a call connection attempt to a called telephone number in excess of a mass call event threshold, and detecting a resource exhaust event based upon a release message of the call connection attempt.

In a further embodiment of the present invention, a system that provides mass call defense, comprises a processor, wherein the processor detects a mass call event indicating a call connection attempt in excess of a mass call event threshold and detects a resource exhaust event based upon a release message of the call connection attempt, and a memory communicably coupled to the processor, wherein the memory stores the detected mass call event, the mass call event threshold and the resource exhaust event.

DETAILED DESCRIPTION OF THE INVENTION

Figure 1:
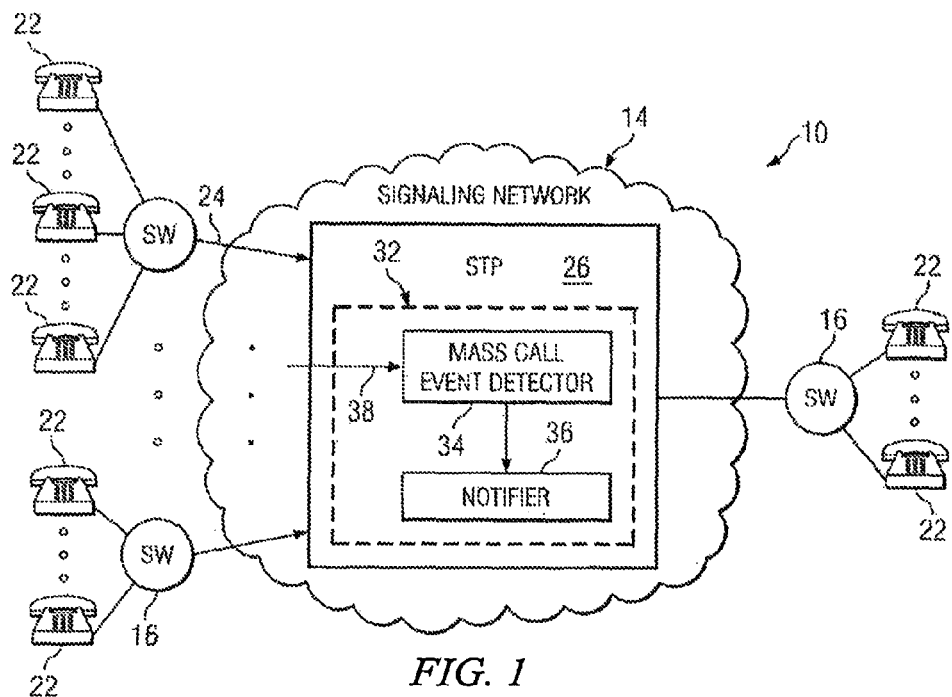
FIG. 1 illustrates a functional block diagram of a telephonic network that includes an embodiment of the present invention as a portion thereof.

Referring first to FIG. 1, a telephonic network, shown generally at 10, operates to provide for communications between communication stations, here telephonic stations that are connected to, or otherwise operable in, the telephonic network. The telephonic network is representative of any various types of telephonic networks that provide for telephonic communications. That is to say, the telephonic network 10 is representative of any of various, conventional telephonic networks that operate to form call connections between telephonic stations forming stations and telephonic stations forming called stations. Upon formation of call connections between the calling and called stations, telephonic communications are permitted. Communication of both voice and non-voice data is permitted between the calling and called stations.

The elements forming the network 10 are functionally represented and, in an actual implementation form either, or both, logical and physical entities. The telephonic network also includes additional elements and entities, not separately shown, for purposes of simplicity. It should be understood, of course, that, in an actual implementation, additional entities and elements form portions of the telephonic network.

The telephonic network includes a signaling network 14 to which a plurality of switch elements 16 are connected. The switch elements are, in turn, coupled to telephonic stations 22.

Any of the telephonic stations 22 can initiate a call to another telephonic station. And, any of the telephonic stations can receive a call initiated by another of the telephonic stations. A telephonic station that initiates a call to another telephonic station is sometimes referred to as a calling station, or an originating station. And, a telephonic station with which another telephonic station initiates a call is referred to as a called station or terminating station. Such terminology shall be used herein.

When a call is initiated, call set-up procedures commence. An IAM message, for instance, is generated by a switch element that is coupled to a calling station. The IAM message is here generated on a line 25. The IAM message includes values of the dialing digits, that is, the telephone number, of a called station to which the call connection is requested.

The signaling network includes one or more signaling transfer points (STPs), of which a single transfer point 26 is shown in the Figure. The signaling transfer point is coupled to the switches 16. During operation, the signaling transfer point operates as a switching center that provides for the transfer from one signaling link to another. When the telephonic network forms a common-channel signaling network, the call that is associated with the signaling is routed through the signaling transfer point. And, when the telephonic network forms a non-associated, common channel signaling network, the signal transfer point need not be the point through which a call, which is associated with the signaling being switched, passes. The telephonic network is representative of either a common-channel signaling network or a non-associated, common-channel signaling network and the signaling transfer point is correspondingly representative of a STP operable in either of such types of networks.

The telephonic network is constructed to be of a selected capacity, that is, of switching and processing capacity to permit a selected activity level. The capacity of the telephonic network is determinative of the number of concurrent call connections that can be made during its operation.

While the telephonic network is typically sized to be of a capacity corresponding to typical, anticipated usage thereof, the network typically is not sized to be of a capacity permitting every telephonic station therein concurrently to be involved in a communication session in which a call connection is formed by every one of the telephonic stations. In typical usage, only a fraction of the telephonic stations connected to the telephonic network are involved in a call that requires a communication connection to be formed. However, in the event of a surge of call attempts, the capacity of the telephonic network to form the requested call connections is exceeded. As noted previously, the occurrence of a mass call event in which a surge of call attempts in a short time period are made results in call congestion conditions that prevent the completion of the desired call connections at the rate at which the call connections are requested.

The signal transfer point 26 includes apparatus 32 of an embodiment of the present invention. The apparatus 26 operates to detect and to facilitate amelioration of the call congestion, in a controlled manner, caused by the mass call event. The apparatus 32 is also functionally represented, formed of functional entities. The functional entities forming the apparatus are implementable in any desired manner, such as by algorithms executable by processing circuitry. And, while the entities forming the signaling transfer point are represented to be embodied at the signal transfer point 26, the functions performed by the entities of the apparatus can also be distributed amongst more than one signaling transfer point, or embodied at other elements, other than a signaling transfer point.

The apparatus includes a mass call event detector 34 and a notifier 36. The mass call event detector operates to detect the occurrence of a mass call event and to provide indications of the detection to the notifier. The notifier operates, responsive thereto, to notify structure of the telephonic network of the mass call event condition, thereby to facilitate amelioration of the congestion conditions in a controlled manner to alleviate the congestion conditions. Operations performed by the detector and the notifier are performed automatically, free of manual intervention. Thereby, the detection is able to be made quickly, and amelioration of the effects correspondingly is able to be made quickly, without the need to await manual intervention to detect and correct for the mass call event.

A network operator-generated input, here represented on the line 38, is used to help to define the mass call event. More particularly, the input value provided by the network operator is a value forming a threshold value that is used in the determination of the occurrence of a mass call event. Through appropriate selection of the threshold value, the network operator is able to control the number of call connection requests that precipitate the indication by the mass call event detector of a mass call event.

Figure 2:
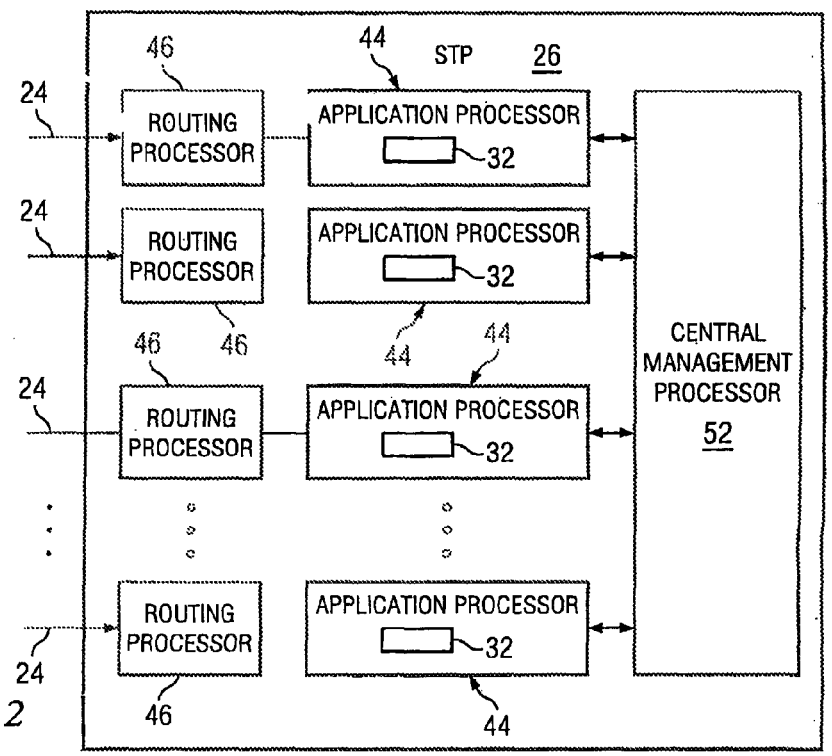
FIG. 2 illustrates a functional block diagram of a signaling transfer point (STP) that forms a portion of the telephonic network shown in FIG. 1 and that is operable pursuant to an embodiment of the present invention.

FIG. 2 illustrates the signal transfer point 26 that forms part of the telephonic network 10 shown in FIG. 1. The signal transfer point, in the exemplary implementation, includes a plurality of application processors 44 and a plurality of routing processors 46. The application processors are processors on which the mass call event application of an embodiment of the present invention are running, or available upon which to run. Each processor 44 'sees' a representative sample of all of the traffic passing through the STP. The routing processors, in the exemplary implementation, correspond in number with the number of the application processors. The routing processors are coupled to receive the IAM messages routed to the signal transfer point on the lines 24. And, the routing processors 46, upon detection of the IAM messages, perform routing functions to route the call requests associated with the IAM messages. And, the signal transfer point also includes a central management processor 52. The central management processor forms the processor that performs the central management of the mass call event notification. In an exemplary implementation, the application processors form DSS processors, and the central management processor forms a CCM processor.

One of the application processors 44 is designated as a processor that operates pursuant to an embodiment of the present invention, that is, to include the apparatus 42 as a portion thereof or otherwise to perform the functions carried out by the apparatus. The application processor that is selected, or otherwise nominated, to perform the detection and notification operations is provided with indications of IAM messages provided thereto. And, because the nominated application processor receives a fractional part of the IAM messages provided to the signal transfer point, detections made by the nominated application processor are representative, in a fractional manner, of the total number of IAM messages delivered to the signal transfer point.

The IAM messages each include values identifying the called station, as well as the calling station that initiates a call to the called station. The nominated application processor analyzes the values, i.e., the values of the dialing digits of the received IAM messages pursuant to the mass call event detection. When a mass call event is detected, the notifier forms a notification message that is provided to a central management processor 52. The central management processor, responsive thereto, alerts the other application processors of the mass call event detection. The other application processors, as well as the nominated application processor, in turn, limit the number of call connections that are permitted during any period, thereby to limit the congestion that otherwise would occur as a result of uncontrolled call connection during a mass call event. And, as a selected number of call connections are permitted by each of the application processors, some call attempts result in successful call connections. The limitation on the number of call connections to a called station that is identified pursuant to the mass call event detection continues for the duration of the mass call event. Thereby, congestion conditions of the mass call event are ameliorated.

Various parameters are utilized in the operation of the apparatus embodied at the nominated application processor. A threshold rate is one of such parameters. The threshold rate is the rate of calls per second to a specific telephone number, i.e., called station that is considered a mass call event. And, action is another of such parameters. The action is the rate of calls per second to the suspect telephone, i.e., the called station to pass through the signal transfer point during the mass call event after which the calls will be returned with a provisionable release cause. And, a match criteria is the threshold rate, divided by the number of application processors, then multiplied by a sampling period.

With, potentially, thousands of messages per second flowing through the routing and the application processors, statistical computations are used to derive additional parameters. The parameters are noted below:

| # AP | Matches | Sample Period | Real Rate | Probability | Annual Events | 80% Rate | Messages | Delta |
|---|---|---|---|---|---|---|---|---|
| 1 | 60 | 2.0 | 30 | 2.1E−114 | 0.00 | 24 | 48.00 | 12.00 |
| 2 | 30 | 2.0 | 30 | 4.99E−49 | 0.00 | 24 | 24.00 | 6.00 |
| 3 | 20 | 2.0 | 30 | 9.98E−30 | 0.00 | 24 | 16.00 | 4.00 |
| 4 | 15 | 2.0 | 30 | 7.86E−21 | 0.00 | 24 | 12.00 | 3.00 |

The amelioration of the call congestion caused by the mass call event functions as an extension of a triggerless call type blocking feature. When this feature is active, all IAM messages are routed to the application processors for query processing.

In the exemplary implementation, the application processor that is utilized to detect the mass call event is selected by the central management processor during system initialization. The apparatus, in another implementation, is embodied at more than one, or all, of the application processors and the central management processor selects which of the application processors is to be nominated.

Figures 3, 4, 5:
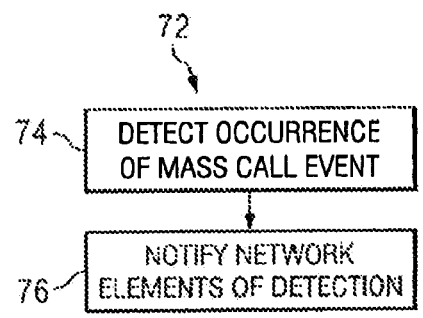
FIG. 3 illustrates a representation of an exemplary array formed during operation of an embodiment of the present invention and used in a preliminary detection of a mass call event.
FIG. 4 illustrates an exemplary representation, similar to that shown in FIG. 3, but of an array that is formed during operation of an embodiment of the present invention to detect the occurrence of a mass call event.
FIG. 5 illustrates a method flow diagram listing the method steps of the method of operation of an embodiment of the present invention.

Also in the exemplary implementation, mass call event detection is made as a two-tier process. During the first stage, that is, the first tier, of the detection process, a 10,000 byte array, illustrated in FIG. 3, shown generally at 58, is formed. The array is formed of the possible values of the final four digits of the telephone number of the called party, contained in each of the IAM messages. Peg counts, indicated in each row 62 of the array, are maintained. And, a count of the detected values of each, or any, of the 10,000 possible values of the final four digits of the called station telephone number is maintained during a sample period. The match criteria, defined to be the threshold value divided by the number of application processors, multiplied by a sample period defines a value that, if a count value is in excess of such value, a telephone number is considered to be a 'suspect' called station. Here the digits '6666' meet the match crieteria and identify a suspect called station.

During a next subsequent sample period, a second-stage, that is, the second tier procedure commences in the event that a suspect called station is identified. Otherwise, the second tier procedure does not commence. A second array, shown generally in Figure at 66, is formed during the second stage detection procedure. During this stage, each telephone number that met the match criteria in the first stage detection procedure is now a suspect number. That is, here, any telephone number having the final four digits of '6666.' During this stage two procedure, the nominated application processor continues to monitor IAM messages and to compare each one to the list of suspect numbers. In the exemplary implementation, the sample period during the second stage procedure corresponds to the sample period of the first stage procedure.

At the end of the sample period, the suspect number, or numbers, that again meet the match criteria are now considered to be the offending numbers. That is, telephone numbers associated with called stations that are parties to a mass call event.

Notification of the identities is provided to the central management processor (shown in FIG. 2). The central management processor then distributes the offending number or numbers, as well as provisioned action to all of the application processors of the signaling transfer point. The application processors each then permit pass through of only a provisioned number of calls for each offending number, and the remainder of the calls are terminated with a release cause. By permitting some calls through for the offending number, the action prevents calls to the offending number from generating congestion at the destination. Class 4 switches, and others, also prevent the calls to the offending number to cause other revenue-generating calls to be lost due to congestion. The nominated application processor continues tier one and tier two detection operations while a mass call event is in effect. When the match criteria is no longer valid, the mass call event is considered to have ended, and the central management processor is notified. And, in turn, the central management processor sends a message to all of the other application processors to indicate that the mass call event has terminated.

FIG. 5 illustrates a method flow diagram, shown generally at 72, representative of operation of an embodiment of the present invention. The method facilitates amelioration of network congestion caused by a mass call event in a telephonic network in which a plurality of call connections are requested to be made to a selected set of called stations within a selected time period.

First, and as indicated by the block 74, occurrence of the mass call event is detected responsive to indications of selected attempts to form call connections between selected calling stations and selected called stations during operation of the telephonic network. Then, and as indicated by the block 76, network elements are notified of the mass call event responsive to detections of the mass call event. The notifications are made manually and free of manual interaction.

Thereby, a manner is provided by which automatically to detect and to initiate amelioration of congestion caused by a mass call event.

The previous descriptions are of preferred examples for implementing the invention, and the scope of the invention should not necessarily be limited by this description.

Alternate Embodiments

Mass call events to a telephone number generate network congestion and result in loss of revenue to the network operator due to lack of call completion. There are instances in which the previously described solution does not take into account the capacity of a called switch. If such a capacity were exceeded, calls could be released that may have been successfully completed. Further, there are instances in which the previously described solution does not take into account situations where a calling telephone number is overloading the called switch, which can occur, for example, when an auto dialer (which is a system that calls numbers that are stored in a list or database) is being used. The present invention, as described in the following alternate embodiments, will alleviate such mass call events more efficiently by taking into account network resources that may be utilized, for example, to complete calls.

In an embodiment of the present invention, a mass call event is detected indicating that a calling switch or calling phone number is generating traffic at a level above a user-defined threshold. In other embodiments, the threshold may be defined by an electronic device, or a combination of a user and an electronic device. Detection of an originating mass call event can use the same algorithm as described in the previous embodiment, however, the calling number in the IAM is used to derive the 'suspect' calling station or the originating point code is used to detect the 'suspect' switch. The present invention assesses the condition of the network resources such as assessing called switches before releasing calls. As such, a flow of traffic from the called switch is assessed to detect a resource exhaust event which can include a circuit exhaust event leading to an overloaded condition.

The present invention correlates the data from a resource exhaust event such as a receipt of a circuit exhaust message from the called switch with the data collected from the mass call event and determines that a particular network element or set of network elements is in distress, as indicated by the circuit exhaust event. It is further determined that a specific calling element, or set thereof, are causing this distress, as indicated by the mass call event. The network element thus enabled with the present invention undertakes to alleviate the condition at the distressed switch by targeting release messages back to the offending element, as indicated in the mass call event. During the alleviation, the network element, continues to monitor both the mass call event and resource exhaust event status of all elements, and ceases the alleviation action upon abatement of the condition, as indicated by either the mass call event or resource exhaust event.

It is important to note that only switches in distress are affected by the action taken, so that revenue generating calls continue to be routed to switches that are not in distress.

Further, in a scenario where an actual Denial of Service attack is taking place (i.e. a malicious agent is using equipment to cause a target network to be unable to serve the majority of its customers), the present invention will detect that the targeted network elements are in distress as a result of the attack and take action to release calls from the malicious agent, while leaving the calls of innocent parties to continue through the network.

The present invention can also be applied to a scenario where the mass call event is detected on a called phone number. In this case, where many calls are being targeted to one called phone number or one called point code, calls would be released back to a plurality of calling nodes.

The time between a switch reaching a resource exhaust condition and the network element enabled with the present invention detecting the occurrence thereof, shall preferably be less than 60 seconds. In other embodiments, the detecting may take longer than 60 seconds. Hysteresis considerations for onset and abatement of such events can be taken into account.

Figure 6:
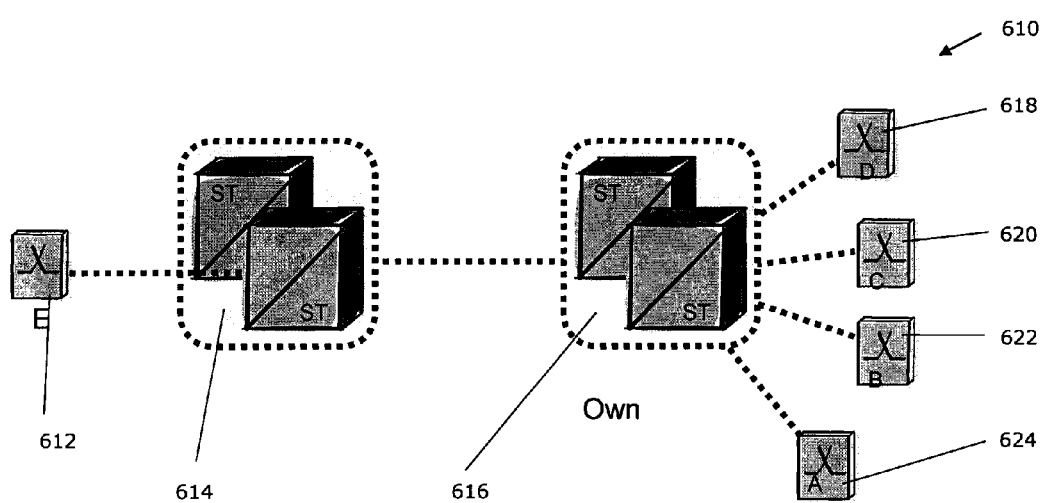
FIG. 6 illustrates a second functional block diagram of a telephonic network that includes an embodiment of the present invention as a portion thereof.

Referring now to FIG. 6, second functional block diagram of a telephonic network 610 is depicted and comprises a number of blocks or modules that are software, hardware, or firmware, and/or the combination of software, hardware, and/or firmware. The switch E 612 is communicably connected to a first Signaling Transfer Point (STP) 614, which is communicably connected to a second STP 616, which in turn is communicably connected to switches A 618, B 620, C 622, and D 624.

In the example scenario, mass call detection is enabled at the second STP pair 616 and a user sets a mass call event threshold and a resource exhaust threshold. The mass call event threshold can be set for an originating element (to detect calls being generated above the threshold by either a calling number or calling point code) or for a destination element (to detect calls being received above the threshold by either a calling number or calling switch). If significant call volume is generated (above the mass call event threshold) through switch E 612 by a suspect, the suspect could be identified by the calling party number or originating point code information. In alternate embodiments, other information can be used to identify the suspect. If the STP detects that call volume exceeds the mass call event threshold for an originating element, the STP identifies the switch E 612 as the source. The STP monitors the flow of release messages back from switches A, B, C, and D. If, for example, the STP detects that switch A 624 is sending release messages above the resource exhaust threshold, indicating a circuit exhaust, the STP begins to take user provisioned action such as issuing a notification and/or releasing calls from the offending party, which could be a calling party number or a originating switch. In one case, where the mass call event is detected for an originating phone number, the calls are only released from the offending phone number. In another case, where the mass call event is detected for an originating point code, all calls would be released from the offending switch at the STP destined for the distressed switch. The STP continues to monitor call volume and the flow of release messages. If the mass call event has ended, the STP ceases taking the user provisioned action, and resumes normal operation. The cessation by the STP of the user provisioned action may be subject to hysteresis constraints. The transfer of information between the modules (switches, STPs, and the like) occurs via at least one of: a wireless protocol, a wired protocol and a combination of the wireless protocol and the wired protocol.

Figure 7:
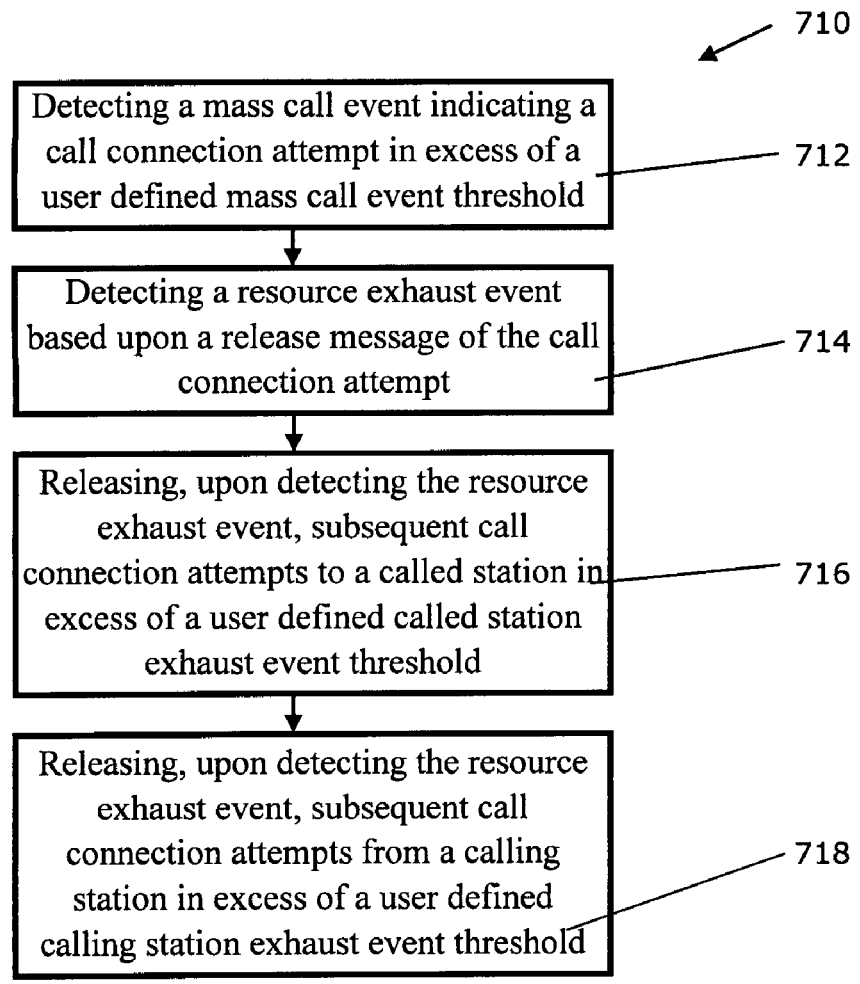
FIG. 7 illustrates a second method flow diagram listing the method steps of the method of operation of an embodiment of the present invention.

Referring now to FIG. 7, a method flow diagram 710 of mass call defense is depicted. A method for mass call defense in a communications network comprises, detecting 712 a mass call event, detecting 714 a resource exhaust event related to the mass call event, wherein the resource exhaust event is based upon detection of a flow of release messages indicating a call connection attempt in excess of a threshold, and releasing 716, upon detecting the resource exhaust event, subsequent call connection attempts to the distressed destination (either a called telephone number or called switch). The method may further comprise releasing, upon detecting the resource exhaust event, subsequent call connection attempts from a calling telephone number in excess of a threshold, wherein the mass call event may indicate the call attempt to the called telephone number in excess of a threshold and the mass call event may indicate the call attempt from the calling telephone number in excess of a threshold, wherein the resource exhaust event may be based upon a detection of a flow of release messages, wherein the resource exhaust event is a circuit exhaust event indicating no circuits are available to complete the call connection attempt and the circuit exhaust event is detected from the release message.

The method may also comprise sending a message to a user indicating that the resource exhaust event has occurred, wherein detecting the resource exhaust event, releasing subsequent call connection attempts to the distressed destination, and releasing subsequent call connection attempts from the offending originator(s) are based upon the detecting of the mass call event. The resource exhaust event, such as a circuit exhaust event, is indicated by a circuit exhaust cause code in a release message. In alternate embodiments, other codes can be used to indicate a resource exhaust event has occurred. Such a code would indicate, in regards to a circuit exhaust event, that no circuits are available for the switch to be able to deliver the call.

The present invention allows a service provider or end user to select the message to be used indicate a resource exhaust event has occurred or that resources are unavailable. The present invention may discard traffic destined only for the switches that are in distress and may inform the service provider or end user that that a resource exhaust event has occurred via a message or report. In the present invention, if a switch or switches are overloaded (as indicated by the occurrence of a resource exhaust event), action is taken to release calls above a user-selected directed to the distressed destination, while permitting the call rate below that level to proceed. This allows for timely resolution of a mass call event in the case where, for example, a radio station announced that the $100^{th}$ caller will win a prize. The present invention will allow calls below the user-selected threshold to complete, thus allowing someone to win the prize and bring the mass call event to an end. At the same time, the present invention discards any calls above the user-selected level that are also resulting in a resource exhaust event at the destination switch. The present invention also recognizes and ameliorates the effects of Denial of Service attacks or auto-dialer scenarios which cause resource exhaust events by releasing only the call connections from the calling telephone number(s) that are in excess of a calling telephone number mass call event threshold. The method is performed by software, hardware, or firmware, and/or the combination of software, hardware, and/or firmware.

Figure 8:
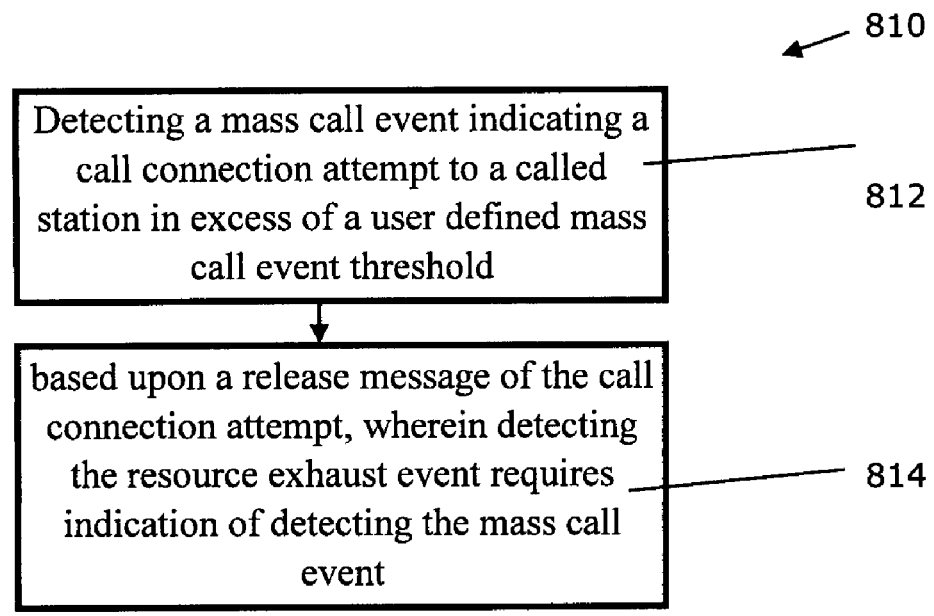
FIG. 8 illustrates a first software flow diagram of mass call defense in accordance with a preferred embodiment of the present invention.

Referring now to FIG. 8, a first software or computer readable medium flow diagram of mass call defense 810 is depicted. A computer readable medium comprises instructions for, detecting 812 a mass call event indicating a call connection attempt in excess of a user defined mass call event threshold, and detecting 814 a resource exhaust event based upon a release message of the call connection attempt. The steps performed in this figure are performed by software, hardware, or firmware, and/or the combination of software, hardware, and/or firmware.

Figure 9:
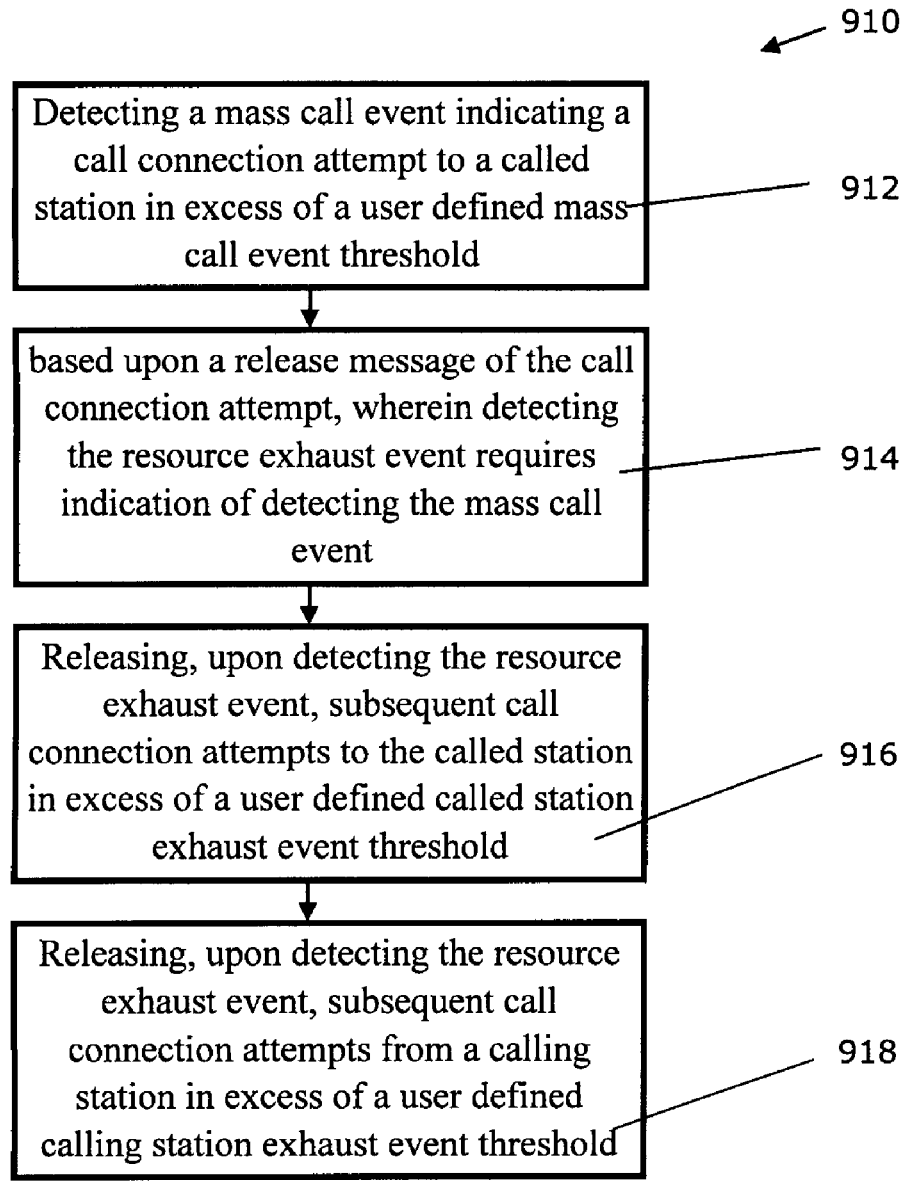
FIG. 9 illustrates a second software flow diagram of mass call defense in accordance with a preferred embodiment of the present invention.

Referring now to FIG. 9, a second software or computer readable medium flow diagram of mass call defense 910 is depicted. A computer readable medium comprises instructions for, detecting 912 a mass call event indicating a call connection attempt in excess of a mass call event threshold, and detecting 914 a resource exhaust event based upon a release message of the call connection attempt. The computer readable medium further comprises instructions for releasing 916, upon detecting the resource exhaust event, subsequent call connection attempts in excess of a mass call event threshold, wherein the resource exhaust event is based upon a detection of a flow of release messages from a destination and the offending originator is based on the type of mass call event detected. The steps performed in this figure are performed by software, hardware, or firmware, and/or the combination of software, hardware, and/or firmware.

Figure 10:
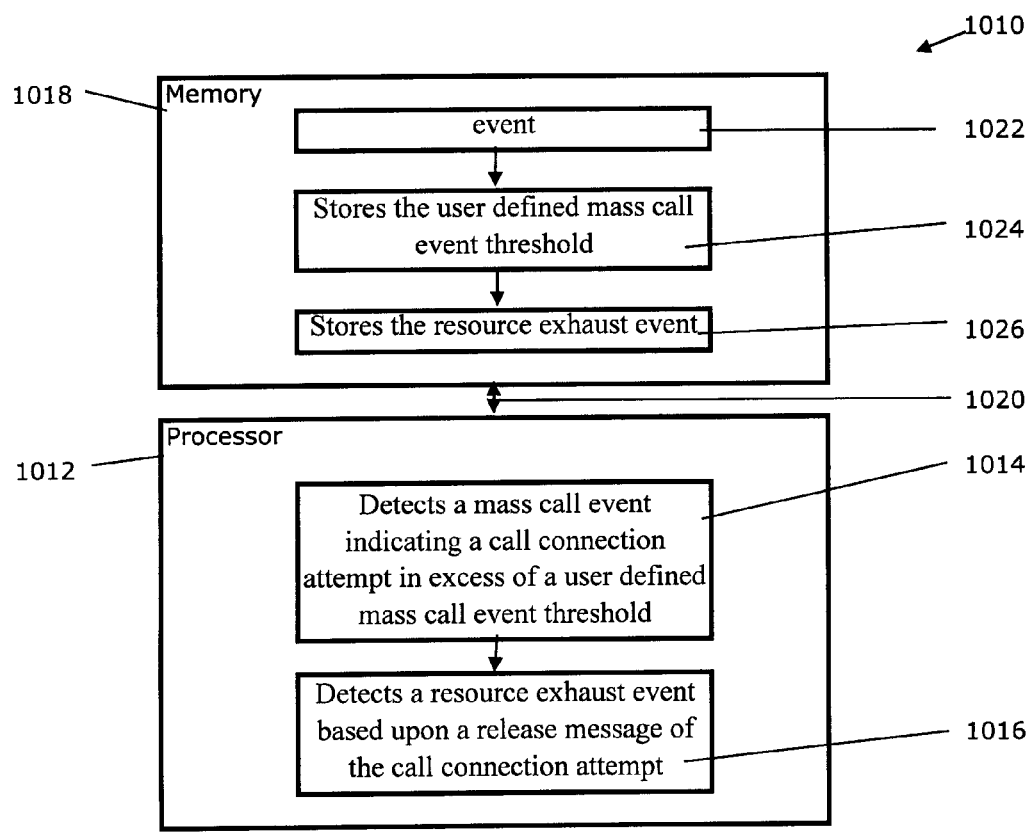
FIG. 10 illustrates a first system of mass call defense in accordance with a preferred embodiment of the present invention.

Referring now to FIG. 10, a first system 1010 that provides a mass call defense is depicted and comprises, a processor 1012, wherein the processor detects 1014 a mass call event indicating a call connection attempt in excess of a mass call event threshold and detects 1016 a resource exhaust event based upon a release message of the call connection attempt, and a memory 1018 communicably coupled 1020 to the processor, wherein the memory stores 1022 the detected mass call event, stores 1024 the user defined mass call event threshold and stores 1026 resource exhaust event. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Figure 11:
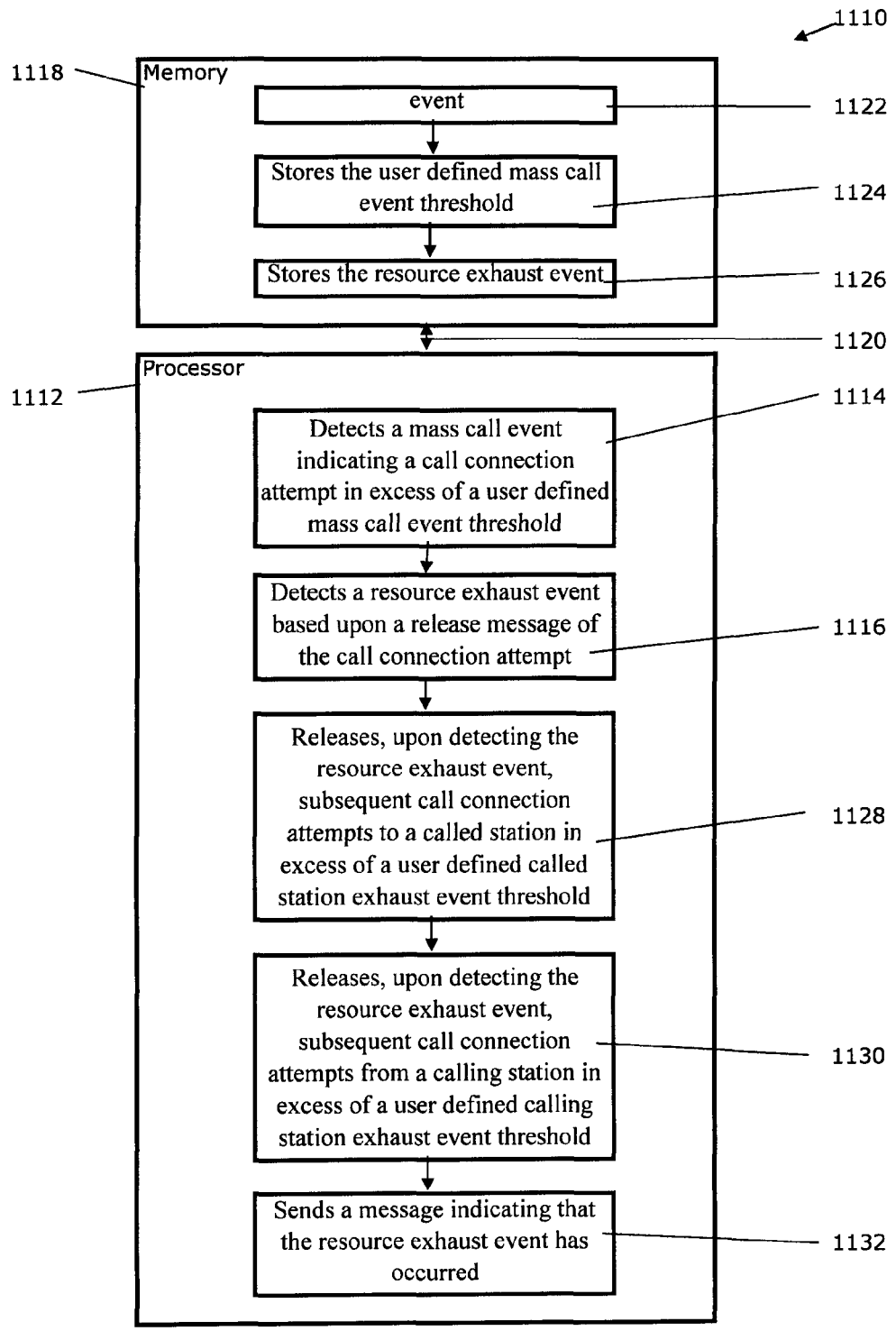
FIG. 11 illustrates a second system of mass call defense in accordance with a preferred embodiment of the present invention.

Referring now to FIG. 11, a second system 1110 that provides mass call defense is depicted and comprises, a processor 1112, wherein the processor detects 1114 a mass call event indicating a call connection attempt in excess of a mass call event threshold and detects 1116 a resource exhaust event based upon a release message of the call connection attempt, and a memory 1118 communicably coupled 1120 to the processor, wherein the memory stores 1122 the detected mass call event, stores 1124 the mass call event threshold and stores 1126 the resource exhaust event, wherein the processor may release 1128, upon detecting the resource exhaust event, subsequent call connection attempts to a distressed destination from an offending originator in excess of a mass call threshold, wherein the processor may send 1130 a message to a user indicating that the resource exhaust event has occurred. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more module, switch, STP, processor or memory. Also, these capabilities may be performed in the current manner or in a distributed manner and on, or via, any device able to provide and/or receive information. Further, although depicted in a particular manner, various blocks may be repositioned without departing from the scope of the current invention. Still further, although depicted in a particular manner, a greater or lesser number of blocks and connections can be utilized with the present invention in order to accomplish the present invention, to provide additional known features to the present invention, and/or to make the present invention more efficient.

What is claimed is:

1. A method for mass call defense in a communications network, comprising:
    detecting a mass call event comprising a plurality of connection attempts to a suspect station, wherein the suspect station is selected from one or more called stations based on monitoring of one or more call setup messages to each of the called stations, and wherein the suspect station is monitored based on a match criteria;
    determining a source of the mass call event;
    detecting a resource exhaust event of a destination element of the communications network;
    correlating the resource exhaust event to the mass call event; and
    releasing one or more subsequent call connection attempts between the source and the destination element.

2. The method of claim 1 wherein the mass call event indicates the call attempt to the destination element in excess of a threshold.

3. The method of claim 1 comprising releasing, upon detecting the resource exhaust event, subsequent call connection attempts from a calling telephone number, wherein the mass call event indicates the call attempt from the calling telephone number in excess of a threshold.

4. The method of claim 1 wherein the resource exhaust event is based upon a release message of the call connection attempt to the destination element.

5. The method of claim 1 wherein the resource exhaust event is based upon detection of a flow of release messages.

6. The method of claim 1 wherein the resource exhaust event is a circuit exhaust event indicating no circuits are available to complete the call connection attempt.

7. The method of claim 6 wherein the circuit exhaust event is detected from a release message from the destination element.

8. The method of claim 1 comprising sending a message to a user indicating that the resource exhaust event has occurred.

9. The method of claim 1 wherein detecting the resource exhaust event is based upon the detecting of the mass call event.

10. The method of claim 1 wherein releasing subsequent call connection attempts to the destination element is based upon the detecting of the mass call event.

11. The method of claim 1 wherein releasing subsequent call connection attempts from the source is based upon the detecting of the mass call event.

12. A computer readable medium comprising computer executable instructions for:
    detecting a mass call event comprising a plurality of connection attempts to a suspect station, wherein the suspect station is selected from one or more called stations based on monitoring of one or more call setup messages to each of the called stations, and wherein the suspect station is monitored based on a match criteria;
    determining a source of the mass call event;

detecting a resource exhaust event related to the mass call event via a resource exhaust event detector;

and releasing one or more subsequent call connection attempts between the source and the destination element.

13. The computer readable medium of claim 12 comprising instructions for releasing, upon detecting the resource exhaust event, subsequent call connection attempts in excess of a user defined mass call event threshold.

14. The computer readable medium of claim 12, wherein the mass call event indicates at least one of: the call attempt to a called switch in excess of a threshold; the call attempt to the called switch from a calling number in excess of a threshold; and the call attempt to the called switch from a calling switch in excess of a threshold.

15. The computer readable medium of claim 12 wherein the resource exhaust event is based upon a release message of the call connection attempt to the called telephone number or called switch.

16. The computer readable medium of claim 12 wherein the resource exhaust event is based upon detection of a flow of the release messages.

17. A system that provides mass call defense, comprising:
a processor,
a resource exhaust event detector that is configured to detect a resource exhaust event at a destination element; and
a memory communicably coupled to the processor, wherein the memory stores the detected mass call event, the mass call event threshold and the resource exhaust event;
wherein the processor detects a mass call event comprising a plurality of connection attempts to a suspect station, wherein the suspect station is selected from one or more called stations based on monitoring of one or more call setup messages to each of the called stations, and wherein the suspect station is monitored based on a match criteria;
wherein the processor determines a source of the mass call event; and
wherein the processor causes one or more call connection attempts between the source and the destination element to be released during the mass call event.

18. The system of claim 17 wherein the processor releases, upon detecting the resource exhaust event, subsequent call connection attempts in excess of a mass call event threshold.

19. The system of claim 17 wherein the processor releases, upon detecting the resource exhaust event, subsequent call connection attempts from a calling telephone number in excess of a mass call event threshold.

20. The system of claim 17 wherein the processor sends a message indicating that the resource exhaust event has occurred.

* * * * *